(12) United States Patent
Tang et al.

(10) Patent No.: US 12,553,012 B2
(45) Date of Patent: *Feb. 17, 2026

(54) LAUNDRY DETERGENT COMPOSITION CONTAINING DYE FIXATIVE AND AMINE OXIDE

(71) Applicant: The Procter & Gamble Company, Cincinnati, OH (US)

(72) Inventors: Ming Tang, Beijing (CN); Peng Qin, Beijing (CN); Qian Gao, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/112,776

(22) Filed: Feb. 22, 2023

(65) Prior Publication Data

US 2023/0203405 A1    Jun. 29, 2023

Related U.S. Application Data

(63) Continuation of application No. PCT/CN2020/118325, filed on Sep. 28, 2020.

(51) Int. Cl.
*C11D 3/37* (2006.01)
*C11D 1/831* (2006.01)
*C11D 3/00* (2006.01)
*C11D 17/04* (2006.01)
*C11D 1/14* (2006.01)
*C11D 1/22* (2006.01)
*C11D 1/72* (2006.01)
*C11D 1/75* (2006.01)

(52) U.S. Cl.
CPC ............ *C11D 3/3723* (2013.01); *C11D 1/831* (2013.01); *C11D 3/0021* (2013.01); *C11D 17/043* (2013.01); *C11D 1/146* (2013.01); *C11D 1/22* (2013.01); *C11D 1/72* (2013.01); *C11D 1/75* (2013.01); *C11D 2111/12* (2024.01)

(58) Field of Classification Search
CPC ..... C11D 3/3723; C11D 1/831; C11D 3/0021; C11D 17/043; C11D 2111/12; C11D 1/22; C11D 1/72; C11D 1/75
See application file for complete search history.

(56) References Cited

U.S. PATENT DOCUMENTS

| | | | |
|---|---|---|---|
| 4,746,456 A | 5/1988 | Kud et al. | |
| 6,855,680 B2 | 2/2005 | Smerznak | |
| 6,858,570 B2 | 2/2005 | Lang et al. | |
| 7,091,167 B2 | 8/2006 | Lang et al. | |
| 7,541,326 B2 | 6/2009 | Lang | |
| 7,541,327 B2 | 6/2009 | Lang | |
| 7,544,652 B2 | 6/2009 | Lang | |
| 7,585,831 B2 | 9/2009 | Lang | |
| 10,323,220 B2 | 6/2019 | Somerville Roberts et al. | |
| 2002/0160928 A1 | 10/2002 | Smerznak et al. | |
| 2002/0193280 A1 | 12/2002 | Lang et al. | |
| 2007/0205921 A1 | 9/2007 | Sawitzki | |
| 2007/0277327 A1 | 12/2007 | Wessling et al. | |
| 2008/0096788 A1 | 4/2008 | Lang | |
| 2008/0103081 A1 | 5/2008 | Lang | |
| 2008/0105847 A1 | 5/2008 | Lang | |
| 2009/0048137 A1 | 2/2009 | Lang | |
| 2011/0061174 A1 | 3/2011 | Boutique | |
| 2015/0322385 A1* | 11/2015 | Ohtani | A01N 31/16 424/408 |
| 2017/0321162 A1 | 11/2017 | Lant et al. | |
| 2018/0023043 A1 | 1/2018 | Lant et al. | |
| 2018/0119070 A1 | 5/2018 | Miracle | |
| 2019/0177661 A1 | 6/2019 | Walters et al. | |
| 2020/0224128 A1* | 7/2020 | Crutcher, Jr. | C11D 3/0021 |
| 2022/0228089 A1 | 7/2022 | Brzoska et al. | |
| 2023/0193158 A1 | 6/2023 | Tang et al. | |
| 2023/0193159 A1 | 6/2023 | Tang et al. | |

FOREIGN PATENT DOCUMENTS

| | | |
|---|---|---|
| CN | 104531406 A | 4/2015 |
| CN | 108441342 A | 8/2018 |
| CN | 108441347 A | 8/2018 |
| CN | 109022172 A | 12/2018 |
| CN | 109810796 A | 5/2019 |
| CN | 111635835 A | 9/2020 |
| EP | 1224253 B1 | 11/2006 |
| JP | S57143583 A | 9/1982 |
| JP | 2013103952 A | 5/2013 |
| JP | 2015218226 A | 12/2015 |
| WO | 0132815 A1 | 5/2001 |
| WO | 0132816 A1 | 5/2001 |
| WO | 2018085386 A1 | 5/2018 |
| WO | 2018124989 A1 | 7/2018 |

OTHER PUBLICATIONS

PCT Search Report and Written Opinion for PCT/CN2020/118325 dated Jul. 1, 2021, 7 pages.
PCT Supplementary Search Report and Written Opinion for PCT/CN2020/118325 dated Dec. 20, 2022, 7 pages.
Non-Final Office Action; U.S. Appl. No. 18/113,682, dated Jan. 24, 2025.

* cited by examiner

*Primary Examiner* — Angela C Brown-Pettigrew
(74) *Attorney, Agent, or Firm* — Abigail O. Idokogi; Andrew J. Mueller; Carrie Schwartz

(57) ABSTRACT

A laundry detergent composition including from 0.01% to 10%, by weight of the composition, of a dye fixative wherein said dye fixative is selected from the group consisting of reaction products of polyamines with cyanamides and acids, reaction products of cyanamides with aldehydes and ammonium salts, reaction products of cyanamides with aldehydes and amines, or reaction products of amines with epichlorohydrin; and any combination thereof, and from 0.01% to 10%, by weight of the composition, of an amine oxide.

15 Claims, No Drawings

LAUNDRY DETERGENT COMPOSITION CONTAINING DYE FIXATIVE AND AMINE OXIDE

FIELD OF THE INVENTION

The present invention relates to a laundry detergent composition containing a dye fixative and an amine oxide.

BACKGROUND OF THE INVENTION

As detergent products are evolving, consumer needs in the term of cleaning have been well met. However, there are still some other unmet consumer needs in the field of laundry. Particularly, one of the unmet needs is to prevent color fading or color bleeding of colored textiles during the wash cycles.

Colored textiles may fade over several wash cycles due to the release of the dyes from the textiles, especially in the case of dark-colored textiles made of cotton and mixed cotton fabrics. On the other hand, color bleeding might occur, i.e., a differently colored or white textile might be stained with the dye released from dyed textiles as a result relatively high dye concentration in the wash liquor if they were washed at the same time. Color fading or color bleeding would result in a rapid deterioration of the appearance of colored textiles. There is therefore a continuing need for laundry detergent compositions that are capable of preventing color fading and/or color bleeding.

Currently, to solve the problem of color fading or color bleeding, so-called dye fixatives are employed in detergent compositions. Such dye fixatives are usually cationic polymers which could bind negative-charged dyes on the textiles or in the washing liquor so as to prevent the detachment of dyes from colored textiles or redeposition of dyes onto white textiles or textiles with a different dye. However, the color protection achieved by detergent compositions containing such dye fixatives are not sufficient to meet consumers' expectation. Additionally, in formulations comprising anionic surfactants, especially linear alkylbenzene sulfonates, the addition of such dye fixatives always fails to deliver any benefit in the aspect of color protection.

Therefore, there are still needs for providing a laundry detergent composition containing a dye fixative which is capable of more effectively provide a color protection.

SUMMARY OF THE INVENTION

It is a surprising and unexpected discovery of the present invention that incorporation of an amine oxide, particularly a $C_6$-$C_{20}$ alkyldimethyl amine oxide (AO), into a laundry detergent composition containing a dye fixative can significantly improve the color protection of the dye fixative.

Correspondingly, the present invention in one aspect relates to a laundry detergent composition, comprising:
  a) from 0.01% to 10% by weight of the composition, of a dye fixative wherein the dye fixative is selected from the group consisting of:
    i) reaction products of polyamines with cyanamides and acids such as organic and/or inorganic acids,
    ii) reaction products of cyanamides with aldehydes and ammonium salts,
    iii) reaction products of cyanamides with aldehydes and amines, or
    iv) reaction products of amines with epichlorohydrin; and
    v) any combinations thereof.
  b) from 0.01% to 10% by weight of the composition, of an amine oxide.

Preferably, the weight ratio of the dye fixative to the amine oxide may be between 0.05 and 10, preferably between 0.1 and 5, more preferably between 0.15 and 2, and most preferably between 0.2 and 1, for example 0.3, 0.4, 0.5, 0.6, 0.7, 0.8, 0.9, 1, 2, 3, 4, 5, 6, 7, 8, 9, 10 or any ranges therebetween.

In a particularly preferred embodiment of the present disclosure, the composition is a liquid composition comprising:
  a) from 0.15% to 0.9% by weight of the composition, of a dye fixative wherein the dye fixative is selected from the group consisting of reaction products of dimethylamine with epichlorohydrin;
  b) from 0.15% to 2% by weight of the composition, of an amine oxide which is C6-C20 alkyldimethyl amine oxide;
  c) from 4% to 15% by weight of the composition, of a nonionic surfactant system comprising C10-C16 ethoxylated alcohol having a weight average degree of ethoxylation ranging from 5 to 15, preferably 6 to 12, and more preferably 7 to 10; and
  d) from 1% to 10% by weight of the composition, of an anionic surfactant system comprising C10-C16 LAS and C10-C16 alkyl ethoxy sulfates in which preferably, the C10-C16 LAS is present in an amount ranging from 10% to 90%, by weight of the anionic surfactant system;
wherein the weight ratio of the dye fixative to the amine oxide is between 0.2 and 2, preferably between 0.2 and 1 and wherein the weight ratio of the nonionic surfactant system to the anionic surfactant system is between 1.5 and 8.

In a particularly preferred embodiment of the present disclosure, the composition is an unit dose composition comprising:
  a) from 0.5% to 3% by weight of the composition, of said dye fixative wherein said dye fixative is selected from the group consisting of reaction products of dimethylamine with epichlorohydrin;
  b) from 0.5% to 8% by weight of the composition, of said amine oxide which is $C_6$-$C_{20}$ alkyldimethyl amine oxide;
  c) from 10% to 35% by weight of the composition, of said nonionic surfactant system comprising $C_{10}$-$C_{16}$ ethoxylated alcohol having a weight average degree of ethoxylation ranging from 7 to 9; and
  d) from 3% to 25% by weight of the composition, of said anionic surfactant system comprising $C_{10}$-$C_{16}$ LAS and $C_{10}$-$C_{16}$ alkyl ethoxy sulfates in which said $C_{10}$-$C_{16}$ LAS is present in an amount ranging from 40% to 90%, by weight of the anionic surfactant system;
wherein the weight ratio of the dye fixative to the amine oxide is between 0.2 and 2, preferably between 0.2 and 1 and wherein the weight ratio of the nonionic surfactant system to the anionic surfactant system is between 1.5 and 8.

In another aspect, the present invention relates to a method of protecting color in a colored fabric comprising contacting the colored fabric with the laundry detergent composition as mentioned hereinabove. Preferably, the protection of the color is achieved by fixing dyes in the colored fabric and/or preventing color fading or color bleeding from the colored fabric.

In another aspect, the present invention relates to a method of preventing color fading or color bleeding of a colored fabric comprising contacting the colored fabric with the laundry detergent composition as mentioned hereinabove.

In another aspect, the present invention relates to a method of fixing dyes in a colored fabric comprising contacting the colored fabric with the laundry detergent composition as mentioned hereinabove.

It is an advantage of the laundry detergent composition to deliver an effective color protection for colored fabrics including e.g. the prevention of color fading and/or color bleeding and dye fixing.

It is another advantage of the laundry detergent composition to provide a balance of performances between colored fabrics having different colors (e.g., red and blue).

DETAILED DESCRIPTION OF THE INVENTION

Definitions

As used herein, the articles including "a" and "an" when used in a claim, are understood to mean one or more of what is claimed or described.

As used herein, the terms "comprise", "comprises", "comprising", "include", "includes", "including", "contain", "contains", and "containing" are meant to be non-limiting, i.e., other steps and other ingredients which do not affect the end of result can be added. The above terms encompass the terms "consisting of" and "consisting essentially of".

As used herein, when a composition is "substantially free" of a specific ingredient, it is meant that the composition comprises less than a trace amount, alternatively less than 0.1%, alternatively less than 0.01%, alternatively less than 0.001%, by weight of the composition, of the specific ingredient.

As used herein, the term "laundry detergent composition" means a composition for cleaning soiled materials, including fabrics. Such compositions may be used as a pre-laundering treatment, a post-laundering treatment, or may be added during the rinse or wash cycle of the laundering operation. The laundry detergent composition compositions may have a form selected from liquid, powder, unit dose such as single-compartment or multi-compartment unit dose, pouch, tablet, gel, paste, bar, or flake. Preferably, the laundry detergent composition is a liquid or a unit dose composition. The term of "liquid laundry detergent composition" herein refers to compositions that are in a form selected from the group consisting of pourable liquid, gel, cream, and combinations thereof. The liquid laundry detergent composition may be either aqueous or non-aqueous, and may be anisotropic, isotropic, or combinations thereof. The term of "unit dose laundry detergent composition" herein refers to a water-soluble pouch containing a certain volume of liquid wrapped with a water-soluble film.

As used herein, the term "main surfactant" refers to a surfactant that is present in a composition at an amount that is greater than any other surfactant contained by such composition. Similarly, the term "main anionic surfactant" refers to an anionic surfactant that is present in a composition at an amount that is greater than any other anionic surfactant contained by such composition As used herein, the term "majority surfactant" refers to a surfactant that is present in a composition at an amount that is at least 50% by weight of the total surfactant content in such composition. Similarly, the term "majority anionic surfactant" refers to an anionic surfactant that is present in a composition at an amount that is at least 50% by weight of the total anionic surfactant content in such composition.

As used herein, the term "alkyl" means a hydrocarbyl moiety which is branched or unbranched, substituted or unsubstituted. Included in the term "alkyl" is the alkyl portion of acyl groups.

As used herein, the term "washing solution" refers to the typical amount of aqueous solution used for one cycle of laundry washing, preferably from 1 L to 50 L, alternatively from 1 L to 20 L for hand washing and from 20 L to 50 L for machine washing.

As used herein, the term "soiled fabric" is used non-specifically and may refer to any type of natural or artificial fibers, including natural, artificial, and synthetic fibers, such as, but not limited to, cotton, linen, wool, polyester, nylon, silk, acrylic, and the like, as well as various blends and combinations.

Dye Fixatives

The dye fixatives of the present invention are cationic polymers. Without being bound by any theory, it is believed that such dye fixatives with positive charges can bind dyes with negative charges through charge interactions and then prevent the dyes out of the textiles or prevent the redeposition of the dyes onto a different colored textiles. Particularly, the dye fixatives may be selected from the group consisting of reaction products of: i) polyamines with cyanamides and organic and/or inorganic acids, ii) cyanamides with aldehydes and ammonium salts, iii) cyanamides with aldehydes and amines, or iv) amines with epichlorohydrin. Preferably, the dye fixative may be selected from the group consisting of reaction products of amines with epichlorohydrin in which the amines are primary, secondary or tertiary amines. More preferably, the dye fixative may be selected from the group consisting of reaction products of dimethylamine with epichlorohydrin. Most preferably, the dye fixative may be poly(2-hydroxypropyldimethylammonium chloride), also called poly(dimethylamine-co-epichlorohydrin), for example the polymer commercially available under the trade name of TEXCARE DFC 6 from Clariant (CAS #: 25988-97-0).

The term of "amines" comprises monoamines and polyamines. The monoamines used herein may be primary, secondary and tertiary amines. They may be aliphatic amines, for example dialkylamines, especially dimethylamine, alicyclic amines, for example cyclohexylamine, and aromatic amines, for example aniline. However, the amines used herein may also simultaneously have aliphatic, alicyclic and aromatic substituents. In addition, it is also possible to use heterocyclic compounds, for example pyridine. The term "polyamines" herein includes, for example diamines, triamines, tetraamines, etc, and also the analogous N-alkylpolyamines and N,N-dialkylpolyamines. Examples thereof are ethylenediamine, propylenediamine, butylenediamine, pentylenediamine, hexylenediamine, diethylenetriamine, triethylenetetraamine and higher polyamines. Particularly preferred polyamines may be ethylenediamine, diethylenetriamine and dimethylaminopropylamine. The ammonium salts are salts of ammonia, especially ammonium chloride or the abovementioned amines or polyamines with different inorganic or organic acids, or else quaternary ammonium salts.

The cyanamides may be cyanamide or dicyandiamide. Aldehydes used herein may include, for example, aliphatic aldehydes such as formaldehyde, acetaldehyde, propionaldehyde, butyraldehyde; dialdehydes, for example glyoxal; unsaturated aldehydes, for example acrolein, crotonaldehyde and aromatic aldehydes, for example benzaldehyde. Particularly preferred aldehydes may be aliphatic aldehydes such as formaldehyde.

The dye fixatives used herein may also be homo- and copolymers based on diallyldimethylammonium chloride (DADMAC). Copolymers based on DADMAC contain, as further components, other vinylic monomers, for example vinylimidazole, vinylpyrrolidone, vinyl alcohol, vinyl acetate, (meth) acrylic acid/ester, acrylamide, styrene, styrenesulfonic acid, acrylamidomethylpropanesulfonic acid (AMPS), etc. Homopolymers based on DADMAC are obtainable under the trade names Dodigen® 3954, Dodigen 4033 and Genamin PDAC (from Clariant).

Preferably, the dye fixative suitable for use in the present disclosure can be selected from the group consisting of reaction products of amines with epichlorohydrin in which the amines are primary, secondary or tertiary amines. More preferably, the dye fixative suitable for use in the present invention can be selected from the group consisting of reaction products of dimethylamine with epichlorohydrin. Most preferably, the dye fixative may be poly(2-hydroxypropyldimethylammonium chloride).

In one embodiment, the dye fixative is poly(2-hydroxypropyldimethylammonium chloride) of formula (I):

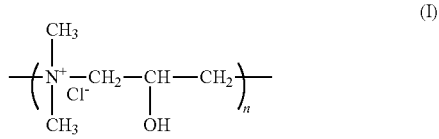

(I)

wherein n is an integer from 5 to 1000.

The dye fixative in the composition according to the present disclosure may be present in an amount ranging from 0.02% to 5%, preferably from 0.05% to 2%, more preferably from 0.1% to 1.5%, most preferably from 0.15% to 0.9%, for example 0.2%, 0.3%, 0.4%, 0.5%, 0.6%, 0.7%, 0.8%, 0.9%, 1.0% or any ranges therebetween, by weight of the composition.

Amine Oxide

The amine oxide suitable for use in the present invention may be selected from the group consisting of $C_6$-$C_{20}$ alkyldimethyl amine oxides (AO) and combinations thereof.

Preferably, the amine oxide is characterized by the following structure:

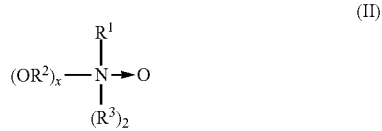

(II)

where $R^1$ is a $C_{6-20}$ alkyl, a $C_{6-20}$ hydroxyalkyl, or a $C_{6-20}$ alkyl phenyl group; each $R^2$ is a $C_{2-5}$ alkylene, or a $C_{2-5}$ hydroxyalkylene group; x is from 0 to about 3; and each $R^3$ is a $C_{1-3}$ alkyl, a $C_{1-3}$ hydroxyalkyl, or a polyethylene oxide containing from about 1 to about 3 ethoxylene (EO) units. Preferably, the amine oxide may be a $C_{8-18}$ alkyldimethyl amine oxide, preferably a $C_{10-16}$ alkyldimethyl amine oxide.

Preferably, the amine oxide is selected from the group consisting of dodecyldimethyl amine oxide, tetradecyldimethyl amino oxide, and a combination thereof. More preferably, the amine oxide contains dodecyldimethyl amino oxide having the following formula (III):

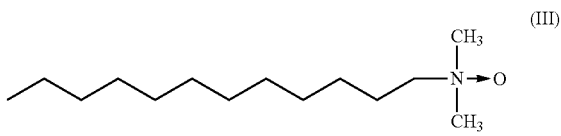 [SMILES: CCCCCCCCCCCC[N+](C)(C)[O-]]

(III)

Such a compound is also referred to as lauryldimethyl amine oxide or dodecydimethyl amine-N-oxide (DDAO). It is commercially available from Huntsman under the tradename Oxamin® LO.

The amine oxide in the composition according to the present disclosure may be present in an amount ranging from 0.01% to 10%, preferably from 0.02% to 8%, more preferably from 0.1% to 3%, most preferably from 0.15% to 2%, for example 0.1%, 0.2%, 0.3%, 0.4%, 0.5%, 0.6%, 0.7%, 0.8%, 0.9%, 1%, 1.5%, 2%, 2.5%, 3%, 4%, 5% or any ranges therebetween, by weight of the composition.

Anionic Surfactant

The laundry detergent composition of the present invention may comprise an anionic surfactant system. Particularly, the laundry detergent composition of the present invention may comprise from 0.1% to 50% by weight of the composition, of an anionic surfactant system.

Preferably, the anionic surfactant system may comprise an anionic surfactant selected from the group consisting of $C_6$-$C_{20}$ linear alkylbenzene sulfonates (LAS), $C_6$-$C_{20}$ alkyl sulfates (AS), $C_6$-$C_{20}$ alkyl alkoxy sulfates (AAS), $C_6$-$C_{20}$ methyl ester sulfonates (MES), $C_6$-$C_{20}$ alkyl ether carboxylates (AEC), and any combinations thereof. More preferably, the anionic surfactant system may comprise a $C_6$-$C_{20}$ LAS and optionally an additional anionic surfactant such as a $C_6$-$C_{20}$ AS and/or a $C_6$-$C_{20}$ AAS. In one embodiment, LAS is $C_{10}$-$C_{16}$ LAS, preferably C12-C14 LAS.

The LAS is normally prepared by sulfonation (using $SO_2$ or $SO_3$) of alkylbenzenes followed by neutralization. Suitable alkylbenzene feedstocks can be made from olefins, paraffins or mixtures thereof using any suitable alkylation scheme, including sulfuric and HF-based processes. By varying the precise alkylation catalyst, it is possible to widely vary the position of covalent attachment of benzene to an aliphatic hydrocarbon chain. Accordingly, the LAS herein can vary widely in 2-phenyl isomer and/or internal isomer content.

In some embodiments of the laundry detergent composition, $C_6$-$C_{20}$ LAS may be present in an amount ranging from 1% to 100%, preferably from 10% to 99%, more preferably from 20% to 95%, most preferably from 30% to 90%, for example 40%, 50%, 60%, 70%, 80%, 90% or any ranges therebetween, by weight of the anionic surfactant.

In some embodiments of the laundry detergent composition, the level of LAS is preferably higher than that of any other anionic surfactant contained by such composition, i.e., the LAS is the main anionic surfactant in such composition.

The anionic surfactant suitable for use in the present disclosure may further comprise $C_6$-$C_{20}$ alkyl sulfates (AS), $C_6$-$C_{20}$ alkyl alkoxy sulfates (AAS), $C_6$-$C_{20}$ methyl ester sulfonates (MES), $C_6$-$C_{20}$ alkyl ether carboxylates (AEC), or any combinations thereof. For example, the laundry detergent composition may contain a $C_6$-$C_{20}$ alkyl alkoxy sulfates (AAxS), wherein x is about 1-30, preferably about 1-15, more preferably about 1-10, most preferably x is about 1-3. The alkyl chain in such $AA_xS$ can be either linear or branched, with mid-chain branched $AA_xS$ surfactants being particularly preferred. A preferred group of $AA_xS$ include $C12$-$C_{14}$ alkyl alkoxy sulfates with x of about 1-3. The amount of $AA_xS$ surfactant(s) in the laundry detergent composition of the present invention may range from about 0.05% to about 100%, preferably from about 0.1% to about 80%, more preferably from about 0.5% to about 50%, most preferably from about 1% to about 30%, for example 5%, 10%, 20%, 30%, 40%, 50%, 60%, 70%, 80%, 90% or any ranges therebetween, by weight of the composition.

In some embodiments, the weight ratio of LAS to $AA_xS$ is at least 0.6, preferably at least 0.8, more preferably at least 0.9, most preferably at least 1, for example 0.6, 0.7, 0.8, 0.9, 1, 1.2, 1.5, 2, 2.5, 3, 4, 5, 8, 10 or any ranges therebetween.

The anionic surfactant system in the composition according to the present disclosure may be present in an amount ranging from 0.1% to 45%, preferably from 0.5% to 40%, more preferably from 1% to 35%, most preferably from 2% to 30%, for example 2%, 3%, 4%, 5%, 6%, 7%, 8%, 9%, 10%, 15%, 20%, 25%, 30%, 35%, 40%, 45%, 50% or any ranges therebetween, by weight of the composition.

In some embodiments of the present disclosure, the anionic surfactant in the composition according to the present disclosure may comprise less than 30%, preferably less than 20%, more preferably less than 10%, most preferably less than 5%, of soap by weight of the anionic surfactant.

Nonionic Surfactants (NI)

The laundry detergent composition of the present invention may comprise a nonionic surfactant system. The nonionic surfactant system may comprise a nonionic surfactant selected from the group consisting of alkyl alkoxylated alcohols, alkyl alkoxylated phenols, alkyl polysaccharides, polyhydroxy fatty acid amides, alkoxylated fatty acid esters, alkyl polyglycosides (APG), methyl ester ethoxylates (MEE), sucrose esters, sorbitan esters and alkoxylated derivatives of sorbitan esters, and any combinations thereof. Preferably, the nonionic surfactant system may comprise a $C_6$-$C_{20}$ alkoxylated alcohol having a weight average degree of alkoxylation ranging from 1 to 20, preferably from 5 to 15, more preferably from 7 to 10. More preferably, the nonionic surfactant system may comprise a $C_8$-$C_{18}$ ethoxylated alcohol having a weight average degree of ethoxylation ranging from 1 to 20, preferably from 5 to 15, more preferably from 7 to 10.

Non-limiting examples of nonionic surfactants suitable for use herein include: $C_{12}$-$C_{18}$ alkyl ethoxylates, such as $C_{12}$-$C_{14}$ alkyl ethoxylates with EO 7-9; Neodol® nonionic surfactants available from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as Pluronic® available from BASF; $C_{14}$-$C_{22}$ mid-chain branched alkyl alkoxylates, BAEx, wherein x is from about 1 to about 30; alkylpolysaccharides, specifically alkylpolyglycosides; polyhydroxy fatty acid amides; and ether capped poly(oxyalkylated) alcohol surfactants. Also useful herein as nonionic surfactants are alkoxylated ester surfactants such as those having the formula $R^1C(O)O(R_2O)nR^3$ wherein $R^1$ is selected from linear and branched $C_6$-$C_{22}$ alkyl or alkylene moieties; $R^2$ is selected from $C_2H_4$ and $C_3H_6$ moieties and $R^3$ is selected from H, $CH_3$, $C_2H_5$ and $C_3H_7$ moieties; and n has a value between about 1 and about 20. Such alkoxylated ester surfactants include the fatty methyl ester ethoxylates (MEE) and are well-known in the art.

In a particular embodiment, the alkoxylated nonionic surfactant contained by the laundry detergent composition of the present invention is a $C_6$-$C_{20}$ alkoxylated alcohol, preferably $C_8$-$C_{18}$ alkoxylated alcohol, more preferably $C_{10}$-$C_{16}$ alkoxylated alcohol. The $C_6$-$C_{20}$ alkoxylated alcohol is preferably an alkyl alkoxylated alcohol with an average degree of alkoxylation of from about 1 to about 50, preferably from about 3 to about 30, more preferably from about 5 to about 20, even more preferably from about 5 to about 9. The alkoxylation herein may be ethoxylation, propoxylation, or a mixture thereof, but preferably is ethoxylation. In one embodiment, the alkoxylated nonionic surfactant is $C_6$-$C_{20}$ ethoxylated alcohol, preferably $C_8$-$C_{18}$ alcohol ethoxylated with an average of about 5 to about 20 moles of ethylene oxides, more preferably $C_{10}$-$C_{16}$ alcohol ethoxylated with an average of about 5 to about 9 moles of ethylene oxides. The most preferred alkoxylated nonionic surfactant is $C_{12}$-$C_{15}$ alcohol ethoxylated with an average of about 7 moles of ethylene oxide, e.g., Neodol® 25-7 commercially available from Shell.

The nonionic surfactant system in the composition according to the present disclosure may be present in an amount ranging from 1% to 45%, preferably from 2% to 40%, more preferably from 3% to 35%, most preferably from 4% to 30%, for example 4%, 5%, 6%, 7%, 8%, 9%, 10%, 11%, 12%, 13%, 14%, 15%, 20%, 25%, 30% or any ranges therebetween, by weight of the composition.

In some embodiments, the weight ratio of the nonionic surfactant system to the anionic surfactant system is between 1.5 and 20, preferably between 1.7 and 15, more preferably between 1.9 and 10, and most preferably between 2 and 8, for example 1.5, 1.6, 1.7, 1.8, 1.9, 2, 2.1, 2.2, 2.3, 2.5, 3, 4, 5, 6, 7, 8, 9, 10 and any ranges therebetween.

Other Ingredients

The laundry detergent composition according to the present disclosure may further comprise from 0.01% to 10%, preferably from 0.1% to 5%, more preferably from 0.2% to 3%, most preferably from 0.3% to 2%, by weight of the composition, of a surfactant boosting polymer, preferably polyvinyl acetate grafted polyethylene oxide copolymer.

The laundry detergent composition of the present invention may further comprise a cationic surfactant. Non-limiting examples of cationic surfactants include: quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; and amino surfactants, specifically amido propyldimethyl amine (APA).

The laundry detergent composition herein may comprise adjunct ingredients. Suitable adjunct materials include but are not limited to: builders, chelating agents, rheology modifiers, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, photobleaches, perfumes, perfume microcapsules, structure elasticizing agents, fabric softeners, carriers, hydrotropes, processing aids, solvents, hueing agents, structurants and/or pigments. The precise nature of these adjunct ingredients and the levels thereof in the laundry detergent composition will depend on the physical form of the composition and the nature of the cleaning operation for which it is to be used.

In some embodiments, the laundry detergent composition according to the present disclosure may further comprise from 0.01% to 10%, preferably from 0.1% to 5%, more preferably from 0.2% to 3%, most preferably from 0.3% to 2%, by weight of the composition, of a fatty acid.

Composition Preparation

The laundry detergent composition of the present invention is generally prepared by conventional methods such as those known in the art of making laundry detergent compositions. Such methods typically involve mixing the essential and optional ingredients in any desired order to a relatively uniform state, with or without heating, cooling, application of vacuum, and the like, thereby providing laundry detergent compositions containing ingredients in the requisite concentrations.

Method of Use

Another aspect of the present invention is directed to a method of using the laundry detergent composition to treat a fabric. Such method can deliver a color protection benefit. The method comprises the step of administering from 5 g to 120 g of the above-mentioned laundry detergent composition into a laundry washing basin comprising water to form a washing solution. The washing solution in a laundry washing basin herein preferably has a volume from 1 L to 50 L, alternatively from 1 L to 20 L for hand washing and from 20 L to 50 L for machine washing. The temperatures of the laundry washing solution preferably range from 5° C. to 60° C.

The dosing amount in the method herein may be different depending on the washing type. In one embodiment, the method comprises administering from about 5 g to about 60 g of the laundry detergent composition into a hand washing basin (e.g., about 2-4 L). In an alternative embodiment, the method comprises administering from about 5 g to about 100 g, preferably from about 10 g to about 65 g of the laundry detergent composition into a washing machine (e.g., about 30-45 L).

Test Method

Test 1: Dye Bleeding Test

Dye bleeding test is conducted by using Tergotometer (Model: RHLQ1V, from Research Institute of Daily Chemical Industry (RIDCI)) as below:

1) Cut ~1.0 g of test fabric (ASIE-130 or ASIE-133) in each piece for each tube of tergotometer;
2) Add 1 L reverse osmosis (RO) water that has water hardness level of about 9 gpg (with a $Ca^{2+}$-to-$Mg^{2+}$ weight ratio of about 4:1) heated to 40° C. with a water bath;
3) Dissolve about 2.0 grams of the sample liquid detergent composition to form a wash liquor with a detergent dosage of about 2000 ppm;
4) Adjust pH of solution to ~8.5;
5) Take out ~30 ml solution to measure L*/a*/b* before wash, (measured with UltraScan VIS (from HunterLab, Virginia, USA) by using 5 cm×1 cm sample cell);
6) Add one piece of 1.0 g test fabric into each tube and wash for about 20 minutes;
7) Take out ~30 ml solution to measure L*/a*/b under same condition as Step 5); and
8) Calculate ΔE based on before and after wash measurement, the higher ΔE indicates the worse dye bleeding.

EXAMPLES

Example 1: Synergy Between Dye Fixative and Amine Oxide in the Aspect of Color Protection Four (4) sample liquid laundry detergent compositions were prepared containing the following ingredients. Sample 1 does not contain any dye fixatives or amine oxide. Sample 2 contains an amine oxide, and Samples 3 contains a dye fixative. Samples 4 comprises both a dye fixative and an amine oxide.

TABLE 1

| Ingredients (weight %) | Sample 1 | Sample 2 | Sample 3 | Sample 4 |
|---|---|---|---|---|
| Dye fixative[1] | — | — | 2.6% | 0.6% |
| Dodecyldimethyl Amine Oxide | — | 2.6% | — | 2% |
| $C_{12\text{-}14}EO_7$ | 10% | 10% | 10% | 10% |
| $C_{12\text{-}14}AE_{1\text{-}3}S$ | 2.5% | 2.5% | 2.5% | 2.5% |
| $C_{11\text{-}13}LAS$ | 2.5% | 2.5% | 2.5% | 2.5% |
| Water | Balance | Balance | Balance | Balance |
| Notes | Control | Amine oxide only | Dye fixative only | Amine oxide + Dye fixative |

[1]Dye fixative poly(2-hydroxypropyldimethylammonium chloride) commercially available under the trade name of TEXCARE DFC 6 from Clariant.

In accordance with Test 1: Dye bleeding test as described hereinabove in which fabrics colored by Blue dye (ASIE-133) or Direct Red dye (ASIE-130) is respectively used, the ΔE for these samples was measured as a measurement of dye bleeding. The higher ΔE indicates the worse dye bleeding, while the lower ΔE indicates the more effective color protection.

Blue Fabrics

The results for blue colored fabrics are shown in the table below, in which colored fabrics show color bleeding (i.e., 1.18 of ΔE) after being washed by using Sample 1 without dye fixatives or amine oxide surfactants. Surprisingly, the inventors discovered that the combination of the dye fixative and the amine oxide can deliver an effective color protection, i.e. a significantly reduced color bleeding (0.63 of ΔE) compared to control (1.18 of ΔE), dye fixative alone (2.17 of ΔE) or amine oxide alone (1.09 of ΔE).

TABLE 2

| | Sample 1 | Sample 2 | Sample 3 | Sample 4 |
|---|---|---|---|---|
| ΔE | 1.18 | 1.09 | 2.17 | 0.63 |
| Notes | Control | Amine oxide only | Dye fixative only | Amine oxide + Dye fixative |

Red Fabrics

Another test by using fabrics colored by Red dye (ASIE-130) was conducted to show the color protection for a different color (i.e., red) by using Test 1: Dye bleeding Test described hereinabove. The results are shown in the table below, in which the synergy between the dye fixative and the amine oxide is also observed. It also shows a reduced color bleeding (0.74 of ΔE vs. 0.79 of ΔE) achieved by the combination of the dye fixative and the amine oxide compared to the dye fixative or the amine oxide alone.

TABLE 3

| | Sample 1 | Sample 2 | Sample 3 | Sample 4 |
|---|---|---|---|---|
| ΔE | 0.79 | 0.81 | 1.13 | 0.74 |
| Notes | Control | Amine oxide only | Dye fixative only | Amine oxide + Dye fixative |

Example 2: Exemplary Formulations of Liquid Laundry Detergent Compositions Containing Dye Fixative and Amine Oxide The following liquid laundry detergent compositions shown in Table 4 are made comprising the listed ingredients in the listed proportions (weight %).

TABLE 4

| Ingredients (weight %) | A | B | C | D | E | F |
|---|---|---|---|---|---|---|
| $C_{12\text{-}14}AE_{1\text{-}3}S$ | 4 | 1.5 | 3 | 1 | 4 | 1.5 |
| $C_{11\text{-}13}LAS$ | 2 | 3 | 5 | 1 | 2 | 3 |
| $C_{14\text{-}15}EO_7$ | 10 | 8.5 | 15 | 12 | 5 | — |
| $C_{12\text{-}14}EO_7$ | — | — | — | — | — | 8 |
| APG | — | — | — | — | 5 | 4 |
| MEE | — | — | — | 5 | — | — |
| Dodecyldimethyl amine oxide | 1.5 | 2.0 | 0.5 | 0.5 | 1.5 | 2.0 |
| Dye fixative[1] | 0.5 | 0.9 | 0.7 | 0.3 | 0.5 | 2 |
| Citric acid | 2.4 | 0.5 | 4.8 | 0.6 | — | 2 |
| $C_{12}\text{-}C_{18}$ fatty acid | 3.2 | 1.2 | 2.2 | 2 | 1.5 | 1.2 |
| Na-DTPA | 1 | 0.05 | 0.5 | 0.18 | 0.06 | 0.2 |
| Sodium cumene sulphonate | — | — | — | 4.42 | — | — |
| Ethanol | — | — | — | 1.74 | — | — |
| Calcium chloride | — | — | 0.06 | 0.03 | — | — |
| Magnesium chloride | — | — | — | 0.01 | — | — |
| Silicone emulsion | — | 0.0025 | 0.0025 | 0.0025 | — | 0.0025 |
| Sodium polyacrylate | 1.4 | — | — | — | 1.4 | — |
| Polyethyleneimines | — | — | 1.0 | — | — | — |
| NaOH | Up to pH 8 | Up to pH 8 | Up to pH 8 | Up to pH 8 | Up to pH 8 | Up to pH 8 |
| Na Formate | — | — | — | 0.02 | — | — |
| Tinosan ® HP100 | 0.05 | 0.07 | 0.5 | 0.07 | 0.05 | 0.07 |
| Brightener | — | 0.06 | 0.06 | 0.04 | — | 0.06 |
| Protease | — | — | 0.45 | 0.29 | — | — |
| Amylase | — | — | 0.08 | — | — | — |
| Dye | — | 0.002 | 0.002 | 0.001 | — | 0.002 |
| Perfume oil | — | 0.6 | 0.6 | 0.57 | — | 0.6 |
| Water | Balance | Balance | Balance | Balance | Balance | Balance |

| Ingredients (weight %) | G | H | I | J | K | L |
|---|---|---|---|---|---|---|
| $C_{12\text{-}14}AE_{1\text{-}3}S$ | 3 | 1 | 4 | 1.5 | 3 | 1 |
| $C_{11\text{-}13}LAS$ | 5 | 1 | 2 | 3 | 5 | 1 |
| $C_{14\text{-}15}EO_7$ | — | — | 5 | — | — | — |
| $C_{12\text{-}14}EO_7$ | 6 | — | — | 8 | 6 | — |
| APG | 9 | 12 | — | — | — | — |
| MEE | — | — | 5 | 4 | 9 | 12 |
| Dodecyldimethyl amine oxide | 0.5 | 0.5 | 1.5 | 2.0 | 0.5 | 0.5 |
| Dye fixative[1] | 1.5 | 0.3 | 0.5 | 0.9 | 0.7 | 0.3 |
| Citric acid | 1.7 | 0.6 | — | 2 | 1.7 | 0.6 |
| $C_{12}\text{-}C_{18}$ fatty acid | 1.3 | 2 | 1.5 | 1.2 | 1.3 | 2 |
| Na-DTPA | 0.4 | 0.18 | 0.06 | 0.2 | 0.4 | 0.18 |
| Sodium cumene sulphonate | — | 4.42 | — | — | — | 4.42 |
| Ethanol | — | 1.74 | — | — | — | 1.74 |
| Calcium chloride | 0.06 | 0.03 | — | — | 0.06 | 0.03 |
| Magnesium chloride | — | 0.01 | — | — | — | 0.01 |
| Silicone emulsion | 0.0025 | 0.0025 | — | 0.0025 | 0.0025 | 0.0025 |
| Sodium polyacrylate | — | — | 1.4 | — | — | — |
| Polyethyleneimines | 1.0 | — | — | — | 1.0 | — |
| NaOH | Up to pH 8 | Up to pH 8 | Up to pH 8 | Up to pH 8 | Up to pH 8 | Up to pH 8 |
| Na Formate | — | 0.02 | — | — | — | 0.02 |
| Tinosan ® HP100 | 0.5 | 0.07 | 0.05 | 0.07 | 0.5 | 0.07 |
| Brightener | 0.06 | 0.04 | — | 0.06 | 0.06 | 0.04 |
| Protease | 0.45 | 0.29 | — | — | 0.45 | 0.29 |
| Amylase | 0.08 | — | — | — | 0.08 | — |
| Dye | 0.002 | 0.001 | — | 0.002 | 0.002 | 0.001 |
| Perfume oil | 0.6 | 0.57 | — | 0.6 | 0.6 | 0.57 |
| Water | Balance | Balance | Balance | Balance | Balance | Balance |

[1]Dye Fixative: poly(2-hydroxypropyldimethylammonium chloride) commercially available under the trade name of TEXCARE DFC 6 from Clariant Example 3: Exemplary Formulations of Unite Dose Laundry Detergent Compositions Containing a Dye Fixative and an Amine Oxide The exemplary formulations shown in Table 5 are made for unit dose laundry detergent. These compositions are encapsulated into compartment(s) of the unit dose by using a polyvinyl-alcohol-based film.

TABLE 5

| Ingredients (weight %) | M | N | O | P | Q | R |
|---|---|---|---|---|---|---|
| $C_{11}$-$C_{13}$ LAS | 8 | 6 | 5 | 1 | 8 | 6 |
| $C_{12}$-$C_{14}AE_3S$ | 6 | 10 | 5 | 2 | 6 | 10 |
| $C_{14}$-$C_{15}EO7$ | — | 6 | — | — | 9 | 10 |
| $C_{12}$-$C_{14}EO7$ | 18 | 25 | 16 | 18 | 9 | 15 |
| APG | — | — | — | — | — | — |
| Dodecyldimethyl amine oxide | 5 | 7 | 2 | 10 | 5 | 7 |
| Dye Fixative[1] | 2 | 3.5 | 1 | 5 | 2 | 3.5 |
| Citric acid | 0.5 | 0.7 | 1.1 | 0.5 | 0.5 | 0.7 |
| $C_{12}$-$C_{18}$ fatty acid | 0.5 | 2.4 | 0.5 | 4.8 | 0.5 | 2.4 |
| Sodium cumene sulphonate | 1.3 | 1.3 | 1.3 | 1.3 | 1.3 | 1.3 |
| Tinosan ®HP100 | 0.09 | 1 | 0.05 | 0.5 | — | — |
| Solvent | Balance | Balance | Balance | Balance | Balance | Balance |

| Ingredients (weight %) | S | T | U | V | W | X |
|---|---|---|---|---|---|---|
| $C_{11}$-$C_{13}$ LAS | 5 | 1 | 8 | 6 | 5 | 1 |
| $C_{12}$-$C_{14}AE_3S$ | 5 | 2 | 6 | 10 | 5 | 2 |
| $C_{14}$-$C_{15}EO7$ | 11 | 18 | — | — | — | — |
| $C_{12}$-$C_{14}EO7$ | 5 | — | 9 | 15 | 5 | — |
| APG | — | — | 9 | 10 | 11 | 18 |
| Dodecyldimethyl amine oxide | 2 | 10 | 5 | 7 | 2 | 10 |
| Dye Fixative[1] | 1 | 5 | 2 | 3.5 | 1 | 5 |
| Citric acid | 1.1 | 0.5 | 0.5 | 0.7 | 1.1 | 0.5 |
| $C_{12}$-$C_{18}$ fatty acid | 0.5 | 4.8 | 0.5 | 2.4 | 0.5 | 4.8 |
| Sodium cumene sulphonate | 1.3 | 1.3 | 1.3 | 1.3 | 1.3 | 1.3 |
| Tinosan ®HP100 | — | — | — | — | — | — |
| Solvent | Balance | Balance | Balance | Balance | Balance | Balance |

[1]Dye Fixative: poly(2-hydroxypropyldimethylammonium chloride) commercially available under the trade name of TEXCARE DFC 6 from Clariant The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent composition, comprising:
    a) from 0.01% to 10%, by weight of the composition, of a dye fixative wherein said dye fixative is selected from the group consisting of:
        i) reaction products of polyamines with cyanamides and acids,
        ii) reaction products of cyanamides with aldehydes and ammonium salts,
        iii) reaction products of cyanamides with aldehydes and amines, or
        iv) reaction products of amines with epichlorohydrin; and
        v) any combination thereof,
    b) from 0.01% to 10%, by weight of the composition, of an amine oxide;
    c) from 0.1% to 50%, by weight of the composition, of a nonionic surfactant system;
    d) from 0.1% to 50%, by weight of the composition, of an anionic surfactant system;
    e) from 0.01% to 10%, by weight of the composition, of a fatty acid; and
    f) from 0.01% to 10%, by weight of the composition, of a polyvinyl acetate grafted polyethylene oxide copolymer;
wherein said composition is a liquid composition or a unit dose composition.

2. The laundry detergent composition according to claim 1, wherein the weight ratio of said dye fixative to said amine oxide is between 0.05 and 10.

3. The laundry detergent composition according to claim 1, wherein said dye fixative is present in an amount ranging from 0.02% to 5%.

4. The laundry detergent composition according to claim 1, wherein said amine oxide is present in an amount ranging from 0.02% to 8%, by weight of the composition.

5. The laundry detergent composition according to claim 1, wherein said nonionic surfactant system is present in an amount ranging from 3% to 35%, and comprises a nonionic surfactant selected from the group consisting of alkyl alkoxylated alcohols, alkyl alkoxylated phenols, alkyl polysaccharides, alkyl polyglycosides, methyl ester ethoxylates, polyhydroxy fatty acid amides, alkoxylated fatty acid esters, sucrose esters, sorbitan esters and alkoxylated derivatives of sorbitan esters, or a combination thereof.

6. The laundry detergent composition according to claim 1, wherein said anionic surfactant system is present in an amount ranging from 0.1% to 45%, by weight of the composition; wherein said anionic surfactant system comprises an anionic surfactant selected from the group consisting of $C_6$-$C_{20}$ linear alkylbenzene sulfonates (LAS), $C_6$-$C_{20}$ alkyl sulfates (AS), $C_6$-$C_{20}$ alkyl alkoxy sulfates (AAS), $C_6$-$C_{20}$ methyl ester sulfonates (MES), $C_6$-$C_{20}$ alkyl ether carboxylates (AEC), and any combination thereof.

7. The laundry detergent composition according to claim 6, wherein said $C_6$-$C_{20}$ LAS is present in an amount ranging from 30% to 95%, by weight of the anionic surfactant system.

8. The laundry detergent composition according to claim 1, wherein the weight ratio of said nonionic surfactant system to said anionic surfactant system is between 1.8 and 8.

9. The laundry detergent composition according to claim 7, wherein said composition is a liquid composition comprising:
a) from 0.15% to 0.9%, by weight of the composition, of said dye fixative wherein said dye fixative comprises a reaction product of dimethylamine with epichlorohydrin;
b) from 0.15% to 2%, by weight of the composition, of said amine oxide which is $C_6$-$C_{20}$ alkyldimethyl amine oxide;
c) from 4% to 15%, by weight of the composition, of said nonionic surfactant system comprising $C_{10}$-$C_{16}$ ethoxylated alcohol having a weight average degree of ethoxylation ranging from 7 to 9; and
d) from 1% to 10%, by weight of the composition, of said anionic surfactant system comprising $C_{10}$-$C_{16}$ LAS and $C_{10}$-$C_{16}$ alkyl ethoxy sulfates in which said $C_{10}$-$C_{16}$ LAS is present in an amount ranging from 40% to 90%, by weight of the anionic surfactant system;
wherein the weight ratio of said dye fixative to said amine oxide is between 0.2 and 1, and wherein the weight ratio of said nonionic surfactant system to said anionic surfactant system is between 2 and 8.

10. The laundry detergent composition according to claim 7, wherein said composition is a unit dose composition comprising:
a) from 0.5% to 3%, by weight of the composition, of said dye fixative wherein said dye fixative is selected from the group consisting of reaction products of dimethylamine with epichlorohydrin;
b) from 0.5% to 8%, by weight of the composition, of said amine oxide which is $C_6$-$C_{20}$ alkyldimethyl amine oxide;
c) from 10% to 35%, by weight of the composition, of said nonionic surfactant system comprising $C_{10}$-$C_{16}$ ethoxylated alcohol having a weight average degree of ethoxylation ranging from 7 to 9; and
d) from 3% to 25%, by weight of the composition, of said anionic surfactant system comprising $C_{10}$-$C_{16}$ LAS and $C_{10}$-$C_{16}$ alkyl ethoxy sulfates in which said $C_{10}$-$C_{16}$ LAS is present in an amount ranging from 40% to 90%, by weight of the anionic surfactant system;
wherein the weight ratio of said dye fixative to said amine oxide is between 0.2 and 1, and wherein the weight ratio of said nonionic surfactant system to said anionic surfactant system is between 2 and 8.

11. The laundry detergent composition of claim 1, wherein said dye fixative comprises a reaction product of amines with epichlorohydrin in which the amines are primary, secondary or tertiary amines.

12. The laundry detergent composition of claim 1, wherein said dye fixative comprises a reaction product of dimethylamine with epichlorohydrin.

13. The laundry detergent composition of claim 1, wherein said dye fixative comprises poly(2-hydroxypropyldimethylammonium chloride).

14. A method of protecting color in a colored fabric comprising contacting the colored fabric with the laundry detergent composition according to claim 1.

15. The method according to claim 14, wherein the protection of the color is achieved by fixing dyes in the colored fabric and/or preventing color fading or color bleeding from the colored fabric.

* * * * *